(12) United States Patent
Meyer et al.

(10) Patent No.: US 10,213,806 B2
(45) Date of Patent: Feb. 26, 2019

(54) MELTER FOR SUPPLYING LIQUID ADHESIVE

(71) Applicant: NORDSON CORPORATION, Westlake, OH (US)

(72) Inventors: Bernhard Meyer, Scharnebeck (DE); Hubert Kufner, Lüneburg (DE); Thomas Burmester, Bleckede (DE)

(73) Assignee: Nordson Corporation, Westlake, MD (US)

( * ) Notice: Subject to any disclaimer, the term of this patent is extended or adjusted under 35 U.S.C. 154(b) by 0 days.

(21) Appl. No.: 15/713,261

(22) Filed: Sep. 22, 2017

(65) Prior Publication Data

US 2018/0085776 A1 Mar. 29, 2018

(30) Foreign Application Priority Data

Sep. 27, 2016 (DE) .................... 20 2016 105 381 U (51) Int. Cl.
| | |
|---|---|
| *B05C 11/10* | (2006.01) |
| *B05B 9/00* | (2006.01) |
| *B05B 9/04* | (2006.01) |

(52) U.S. Cl.
CPC .......... *B05C 11/1007* (2013.01); *B05B 9/002* (2013.01); *B05B 9/0403* (2013.01); *B05C 11/1028* (2013.01); *B05C 11/1042* (2013.01); *B05C 11/1026* (2013.01)

(58) Field of Classification Search
CPC combination set(s) only.
See application file for complete search history.

(56) References Cited

U.S. PATENT DOCUMENTS

| | | | | | |
|---|---|---|---|---|---|
| 2,781,546 | A | * | 2/1957 | Hallenbeck | ............. B29C 31/02 425/159 |
| 3,395,694 | A | * | 8/1968 | Ullman | ............... B05C 11/1042 126/343.5 A |
| 3,413,734 | A | * | 12/1968 | Kimball | ................ B29B 13/021 198/530 |
| 3,604,057 | A | * | 9/1971 | Nixdorff, Jr. | ........... B01F 15/04 425/130 |
| 3,773,069 | A | * | 11/1973 | Rebentisch | ......... B05C 11/1042 137/341 |
| 3,874,560 | A | * | 4/1975 | Powning | ................. B29C 31/02 137/614.2 |
| 3,981,416 | A | * | 9/1976 | Scholl | .................... B29B 13/022 222/146.1 |
| 4,790,455 | A | * | 12/1988 | Dieringer | .............. B29B 13/022 126/343.5 R |
| 5,657,904 | A | * | 8/1997 | Frates | ................... B29B 13/022 219/421 |

(Continued)

*Primary Examiner* — Patrick M. Buechner
(74) *Attorney, Agent, or Firm* — Baker & Hostetler LLP (57) ABSTRACT

A melter for processing substantially solid, free-flowing adhesive particulate and supplying liquid adhesive is described. The melter has a tank for receiving adhesive, a heating device coupled with said tank for heating and liquefying adhesive particles, at least one pump for conveying the liquid adhesive, and a filling device for filling the tank with the substantially solid, free-flowing adhesive particulate. The filling device is arranged such that adhesive particulate is fed into the tank through an inlet opening of said tank. A filling device for filling a tank of an adhesive melter with substantially solid, free-flowing adhesive particles is also described.

20 Claims, 10 Drawing Sheets

(56) References Cited

U.S. PATENT DOCUMENTS

| | | | | |
|---|---|---|---|---|
| 5,711,289 | A * | 1/1998 | Gabryszewski | B05C 11/1042 126/284 |
| 5,791,830 | A * | 8/1998 | Fort | B28B 13/021 406/151 |
| 2006/0124761 | A1* | 6/2006 | Shank | B05B 9/002 239/13 |
| 2008/0150192 | A1* | 6/2008 | Perret | B22F 3/1055 264/308 |
| 2010/0209215 | A1* | 8/2010 | Sasamoto | B05C 1/003 412/37 |
| 2013/0105526 | A1* | 5/2013 | Ross | B29B 13/022 222/630 |
| 2013/0112312 | A1* | 5/2013 | Ross | B65B 1/16 141/2 |
| 2014/0102858 | A1* | 4/2014 | Chau | B05C 11/1002 198/617 |
| 2014/0377451 | A1* | 12/2014 | Kim | H01M 4/0419 427/58 |
| 2018/0036921 | A1* | 2/2018 | Green | B32B 27/00 |

\* cited by examiner

MELTER FOR SUPPLYING LIQUID ADHESIVE

CROSS-REFERENCE TO RELATED APPLICATIONS

This application claims priority to foreign German patent application No. DE 20 2016 105 381.1, filed Sep. 27, 2016, the disclosure of which is incorporated by reference in its entirety.

FIELD OF THE INVENTION

The present invention relates to a melter for processing substantially solid, free-flowing adhesive particulate and supplying liquid adhesive, having a tank for receiving adhesive, said tank having an inlet opening for the admission of substantially solid adhesive particles; a heating device coupled with said tank for heating and liquefying adhesive particles, wherein the heating device has at least one adhesive passageway for liquid adhesive; at least one pump for conveying the liquid adhesive; and a filling device for filling the tank with substantially solid, free-flowing adhesive particles, said filling device being arranged in such a way relative to the tank that adhesive particles can be fed into said tank through the inlet opening of said tank. The invention also relates to a filling device for filling a tank of an adhesive melter with substantially solid, free-flowing adhesive particles.

BACKGROUND

Such melters for processing substantially solid, free-flowing adhesive particulate and supplying liquefied adhesive, especially hot melt adhesive, are especially used in industrial applications. Adhesive is generally provided in an initially solid form, for example in the form of particles or pellets or in a block or the like, and then liquefied with the aid of the melter. Solid adhesive pellets or adhesive particles may be provided in solid, free-flowing and therefore pourable form in sacks or other containers, supplied to the melter by means of a filling device and liquefied. The adhesive liquefied with the aid of the heating device of the melter may be conveyed by means of the pump through a hose to a consumer, for example an application device for dispensing and applying the adhesive onto a substrate. For example, the application device may be an application head having a slit nozzle for planar application, or a device for application of one or more beads, or a spray application device, or a manual spray gun.

Depending on the current demand of one or more consumers, the adhesive is liquefied in a specific quantity by means of the heating device. The demand is thereby regularly subjected to strong fluctuations. There may be periods in which the demand is strongly reduced or even interrupted. The melting process, the heating device and the heat and temperature development in the tank in which the adhesive may be present in part in a solid, semisolid or even already liquefied form are subject to an inertia. For example, if the demand on the part of the consumer is interrupted and therefore liquefied adhesive is no longer dispensed from the melter, an elevated, slowly decreasing temperature and thermal energy initially remain in the heating device, in the tank and in the partially liquefied, partially semi-liquefied or still solid adhesive. This thermal energy spreads over time into the adjacent surroundings and especially also into the filling device coupled with the melter, said filling device being for filling the tank with solid adhesive particles. Such a filling device is often and normally arranged above the tank. Heated gases, especially heated air located in the tank, rise upward due to free convection and may arrive in the filling passageway of the filling device through the inlet opening of the tank.

Such a heat input from the area of the tank into the filling device is disadvantageous because, on the one hand, thermal energy is thereby lost from the tank, which increases the power consumption; and, on the other hand, the thermal energy introduced into the filling device can convert adhesive particles located there from the solid state into the liquid or semi-liquid state. This may lead to unwanted effects, for example adhesion of the filling device and, in some circumstances, interruption of the operation of the filling device.

SUMMARY OF THE INVENTION

It is the object of the present invention to specify a melter and a method for supplying liquid adhesive which avoid or reduce the disadvantages of the known devices.

The invention achieves the object given a device of the aforementioned type in that the filling device has a filling passageway and a filling valve with a movable valve body which is arranged in the filling passageway and can be adjusted from a closed position in which the free cross-section of the filling passageway is substantially closed by the valve body and an open position in which the free cross-section of the filling passageway is substantially open.

The filling passageway through which solid adhesive particles may be filled into the heated tank can be closed or opened by means of the filling valve according to the invention having a movable valve body. In the closed position, the valve body closes the filling passageway so that an introduction of heat through the filling passageway into the filling device is advantageously reduced or largely avoided. A heat flow from the tank in which heated, liquefied adhesive is kept ready and is heated by means of the heating device thus does not arrive, or arrives only to a limited extent, in the filling device and in the area in which still solid adhesive particles, such as pellets, are held ready but should not yet be liquefied or melted. By means of the filling valve according to the invention, an unwanted introduction of heat and an unwanted adhesion of adhesive particles above the filling valve are thereby prevented or markedly reduced. The filling valve especially also prevents the inflow of hot gas from the area of the tank, or from the tank, through the filling passageway into the filling device, up to a container for holding ready the solid adhesive particles. A corresponding introduction of energy via heated air, especially heated air rising from the tank, is thus suppressed or markedly reduced according to the invention. Since the filling valve according to the invention, with its valve body movable from the closed position into an open position, may be opened or closed depending on the fluctuating demand for adhesive to be liquefied, the unwanted introduction of heat can be controlled and the filling passageway can be opened to fill the tank so that the solid, free-flowing adhesive particles may be fed into the tank as needed by means of the filling device. According to the invention, it is thus also brought about that, depending on the need, only the required amount of adhesive is ever kept ready in the tank of the melter. The melter is thus not overfilled. The residence time of liquefied adhesive in the melter is also reduced. The thermal stress for the adhesive is thereby reduced. An increased risk of burning is also minimized. According to the invention, it is possible to open the filling valve only to fill the tank via the filling passageway. Not only is unwanted heat introduction thereby reduced, but also no contamination may then arrive in the tank. Warm air does not arrive in the filling device if no filling occurs. Overall, service intervals are extended and the productivity of the melter, and therefore of the entire installation into which the melter is integrated, is increased.

A particularly preferred embodiment is characterized by a controller, a drive unit for adjusting the filling valve, and a sensor unit for detecting adhesive particles within the filling passageway, especially adhesive particles dropping inside the filling passageway in the direction of the filling valve, wherein the sensor unit provides a signal which can be transmitted by means of the controller to the drive unit for adjusting the filling valve, or directly to the drive unit for adjusting the filling valve. Adhesive particles (pellets or the like) located in the filling passageway can be detected by means of such a sensor unit. If adhesive particles are present in the area of the sensor because they should be fed into the tank due to a demand for liquefied adhesive, the valve body of the filling valve may be brought into the open position by means of a corresponding signal so that the adhesive particles may be filled into the tank. The filling passageway is thus opened and the tank may be filled. Only in this opened state may heat arrive in the filling device, for example via rising warm air, but only to a limited extent. This is also counteracted in that rising warm air is somewhat entrained downward by dropping adhesive particles. The melter is preferably controlled by means of the sensor unit and the filling valve according to the invention such that the filling valve is opened only for the time period of the filling. The filling may take place largely automatically by means of the sensor unit. Whenever, due to a demand at the consumer, adhesive particles are directed into the filling device and the adhesive particles arrive in the area of the sensor unit, the filling valve, i.e. the movable valve body, is brought into the open position, whereas otherwise the filling valve, especially the valve body, is brought into the closed position and held there given the lack of a presence of adhesive particles in the area of the sensor unit.

According to an advantageous development, the sensor unit has a transceiver in the form of a light emitter and light receiver. Such an optical sensor is reliable and comparably economically available.

In a preferred embodiment, it is proposed that the valve body of the filling valve has heat-insulating material or is made of a heat-insulating material and/or has at least one heat-insulating layer made of a heat-insulating material. An unwanted heat flow from the tank in the direction of the filling device through said filling device can be further reduced via such a heat-insulating material in the area of the valve body.

According to a further preferred embodiment, it is provided that the valve body is connected with the drive unit, and the valve body is designed as a flap which is rotatable about a rotational axis or movable substantially translationally back and forth. By means of the drive unit, the valve body can be automatically moved back and forth between the closed and open position. The valve body is advantageously designed as a rotatable flap or alternatively as a flap that can be driven translationally back and forth, depending on the preferred design and installation situation. Especially in connection with a sensor unit, an automated operation can be realized in which the filling valve is quickly brought into the open position given the presence of adhesive pellets in the area of the sensor unit due to (dropping) adhesive particles, and the filling valve is subsequently brought into the closed position again after the filling process if adhesive particles are no longer present in the area of the sensor unit.

An additional alternative preferred embodiment is characterized in that the filling passageway possesses at least one opening for discharging gases heated in the tank by means of the heating device. Through such a gas discharge opening, gases heated in the melter, especially warm air, can be led out of the melter with the filling device. The number and size and locations of the gas discharge openings can be adapted to the individual case depending on the amount of heat and gas to be discharged.

According to a preferred development, it is proposed that the at least one gas discharge opening is arranged between the valve body and the inlet opening of the tank, and/or that during operation the at least one gas discharge opening is arranged above the valve body, wherein the opening is preferably designed as an elongated slot or a substantially cylindrical bore. Accumulating heated air may be discharged via a gas discharge opening in the area between tank and filling valve; if necessary, via additionally one or more additional gas discharge openings may be arranged above or upstream—relative to the filling direction of the solid particles—in order to be able to discharge warm air to the surroundings in this area as well. A heat management of the melter can thus be realized overall with simple structural means.

An additional preferred embodiment provides that at least one guide means is arranged inside the filling passageway to guide the adhesive particles and/or to guide gases flowing inside the filling passageway. The guide means is preferably designed in the form of a baffle plate. The one guide means or multiple guide means preferably have a double function: On the one hand, they guide and brake the still solid adhesive particles if necessary during the filling, especially as they drop due to gravity and are fed into the tank. On the other hand, the guide means may also be used to discharge rising gases or flowing, heated gases in the filling passageway in order to guide such air currents especially through openings into the environment. Such guide means are advantageously designed in the form of baffle plates or guide plates or other materials, such as plastic.

According to a preferred development, it is proposed that at least one gas discharge opening is arranged adjacent to, preferably substantially beneath, the guide means, preferably beneath the baffle plate, such that rising heated gases are guided by means of the guide means toward the opening, and thus out of the filling passageway. Alternatively, the embodiment is developed in that at least one guide means is a plate-shaped member, wherein the plate-shaped member is arranged at an incline substantially at an angle approximately between 90° and 10°, particularly preferably at an angle that is substantially between 60° and 30°, relative to the vertical. The solid particles on the one hand and warm air on the other hand can thus be particularly preferably guided.

An additional alternative embodiment is characterized in that the filling passageway is arranged substantially above the inlet opening of the tank, or with at least one section above the filling valve and laterally offset in relation to the inlet opening of the tank. Either the filling passageway is formed directly above the inlet opening of the tank, which has the advantage that the particles drop directly into the tank, essentially due to gravity. Alternatively, the filling passageway may be arranged with at least one section laterally offset and above the filling valve so that the adhesive particles still fall into the tank, especially due to gravity. A laterally offset arrangement has the advantageous effect that, due to the lateral offset, warm air rising from the tank cannot directly rise further upward, but rather may only be discharged via the indirect route or via openings in the area above the tank, and thus does not arrive in sections of the filling device.

A preferred development of the invention provides that the valve body is translationally arranged inside a first section of the filling passageway above the inlet opening of the tank, and the first section is adjoined by a further upper section of the filling passageway, which is laterally offset from the inlet opening of the tank.

An additional embodiment is characterized in that inner surfaces of the filling passageway and/or surfaces of the valve body of the filling valve and/or surfaces of the guide means are provided with a coating material for reducing the friction and/or adhesion, and/or with at least one viewing window in the filling passageway. An adhesion or cementing is thus avoided or counteracted; the friction is also reduced.

BRIEF DESCRIPTION OF THE DRAWINGS

The invention is explained in detail below using preferred exemplary embodiments. Shown are.

DETAILED DESCRIPTION

The melter 1 shown in FIGS. 1 through 6 for supplying liquid adhesive has a tank 2 for receiving adhesive, a heating device 4 for heating and liquefying adhesive particles, a pump 6 for conveying liquid adhesive, a filling device 8 for filling the tank of the melter 1, and a housing 10, as well as additional optional components. The additional components include an electrical controller for controlling the melter 1, as well as individual components of the melter 1. In the exemplary embodiment, the controller is arranged within the housing 10 inside of a section of the housing 10 arranged to the left in FIG. 1 below a control panel 12. The controller may also be positioned entirely or partially at other locations of the melter 1, or also outside of the melter 1, for example within the frame of a central control unit for a plurality of melters and other components of an industrial installation.

Figure 1:
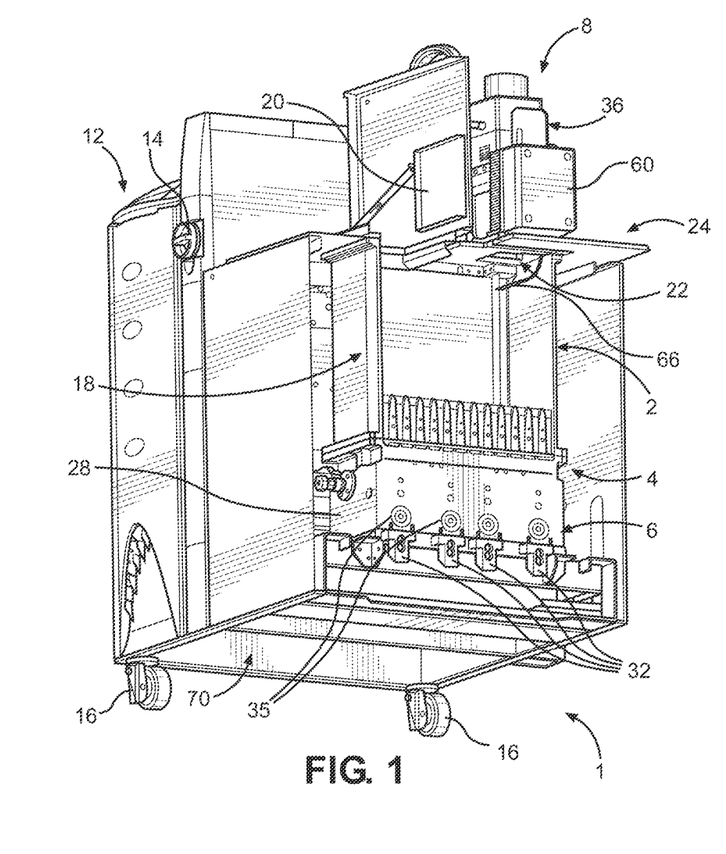
FIG. 1 a melter according to the invention in a first exemplary embodiment in perspective view from below at an angle, with partially opened housing.

The melter 1, together with the controller, can be switched on and off by means of a master switch 14. In a known manner, the housing 10 may have multiple, for example pivotable, flaps and/or doors and/or covers to be opened and closed in addition to wall segments or rollers 16 for moving the melter 1.

The tank 2 arranged inside the housing 10 has a housing 18, formed by multiple side walls, to form an internal space for receiving adhesive, and has a hinged cover 20 for maintenance in the upper area. In the upper area, the tank 2 has an inlet opening 22 for the admission of substantially solid, free-flowing adhesive particles with the aid of the filling device 8. In this exemplary embodiment, the filling device 8 is preferably arranged above the inlet opening 22 of the tank 2 and installed on an installation plate 24 attached to the housing 10.

The preferably electrically heatable heating device 4 is substantially arranged below the housing 18 of the tank 2 and, in a known manner, has heating elements 26 having preferably expanded surfaces such as projections and/or cutouts, ribs, plates or the like so that thermal energy can be transmitted into the internal space of the tank 2, and therefore to the adhesive located in the tank, thus to still solid adhesive particles, partially liquid or entirely liquefied adhesive. Furthermore, the heating device 4 preferably has a plurality of adhesive passageways 27 via which liquefied adhesive can be fed into a preferably block-shaped manifold 28. Adhesive passageways, the pump 6 or even multiple pumps 6, and adhesive filters 30, as well as preferably multiple connections 32 for connecting hoses or conduits for conveying the liquefied adhesive to one or more consumers in the form of adhesive dispenser devices, such as spray guns or the like, are likewise arranged in the manifold 28. For example, the pump 6 may be designed as a gear pump, vane pump or piston pump. The heating device 4 and the manifold 28 are equipped with electrically heatable heating cartridges, for example.

In the exemplary embodiment, the filling device 8 according to the invention is attached to the melter 1 by means of the installation plate 24. In an alternative exemplary embodiment, the filling device according to the invention might also be arranged, in a manner not shown, independently of the melter 1, preferably above the melter 1, on an installation for supplying adhesive in the form of adhesive particles. In this alternative exemplary embodiment, filling device 8 would be provided in the manner of a "standalone" component. As illustrated in enlarged form in FIGS. 4 through 6, the filling device 8 has a housing 36, which is formed by multiple walls 38, 40, 42, 44 or wall segments, preferably designed as flat plates or baffles. In the exemplary embodiment, the walls 38, 40, 42, 44 form an essentially cuboid housing 36; alternatively, other shapes of the housing 36 are also possible, for example substantially cylindrical or tubular shapes.

A filling passageway 46 is formed by the housing 36 in its internal space, via which filling passageway 46 adhesive particles may be guided from a device (not shown), normally arranged above the filling device 8, for receiving a sack, a tank or another container for adhesive pellets or adhesive particles into the tank 2 of the melter 1, and then may be guided into the tank 2 through the inlet opening 22. In the exemplary embodiment, the filling passageway 46 is arranged with its longitudinal axis 48 substantially vertical; see FIGS. 5 and 6. However, other angled arrangements of the filling passageway 46 are also possible. Adhesive particles may thus be fed through the filling passageway 46 into the tank 2. For this purpose, they will especially fall down from the top through the filling passageway 46 due to gravity.

The filling device 8 furthermore has maintenance flaps 48, 50 with retention pins 52, 54 attached thereto (FIGS. 4 through 6), and/or additional housing plates 56, 58 as well as a housing 60 in which electrical and/or electronic components and a controller or parts of a controller, as well as drives for moving components, especially a movable valve body of a filling valve, which is explained in detail below. A protective grating 62 as well as dust protection element, for example in the form of a baffle 64, may also be attached to the outside of the housing 36. Baffle 64 is preferably designed angled, such that it is installed with a first plane section on the housing 36, departs from the housing 36 with an additional middle section sticking out at an angle, and is also suitable for a deflection of dust particles with an additional section arranged parallel to the housing 36.

A deflection or manifold body 66 is arranged on a lower section of the filling device 8. In the exemplary embodiment, the manifold body 66 is designed as a baffle, preferably a curved baffle, preferably curved at an angle of 90°, preferably curved in the shape of a circle. At the bottom, the manifold body 66 adjoins the filling passageway 46 formed in the filling device 8. Adhesive particles that are transported through the filling passageway 46 from the top downward into the tank 2 (FIGS. 1 through 3) are distributed uniformly in the tank 2 by the manifold body 66 so that the adhesive particles arrive, optimally distributed, in the inflow region of the heating device 4 in order to most advantageously be able to absorb thermal energy there in order to be melted. In the exemplary embodiment, the manifold body 66 is essentially arranged with its upper section aligned with the housing 36, formed by the walls 38, 40, 42, 44, and positioned in a lateral section of the tank 2 above the same. The curvature of the manifold body 66 is chosen such that dropping adhesive particles also fall at least partially further into the middle or opposing lateral sections of the tank 2. Different geometric shapes and dimensions of the manifold body 66 may be designed in order to achieve an optimally advantageous introduction of adhesive particles and distribution in the tank 2.

A filling valve 70 (see FIGS. 4 through 6) with a movable valve body 72 is formed on the filling device 8. The movable valve body 72 is arranged within the filling passageway 46 and can be adjusted, thus moved back and forth, from a closed position (FIG. 5) in which the free cross-section of the filling passageway 46 is substantially closed by the valve body 72 and an open position (FIG. 6) in which the free cross-section of the filling passageway 46 is substantially open. In the exemplary embodiment, the valve body 72 is designed as a rotatable plate or flap; other forms and kinematics of the movable valve body 72 are possible. The valve body 72 has a substantially rectangular, preferably cuboid, shape and is adapted to the shape of the cross-section of the filling passageway 46. Other shapes, for example circular shapes, are alternatively possible. The valve body 72 designed in the manner of a flap is attached to a substantially cylindrical shaft 74 that extends horizontally through the filling passageway 46 transversally to the longitudinal axis 48 of the filling passageway. The shaft 74 is mounted laterally on the housing 36, i.e. the housing plate 58, and the opposite wall 42, for example by means of a slide or roller bearing.

A drive unit 76 (see FIG. 4a) is used to move the valve body 72. In the exemplary embodiment, the drive unit 76 serves to rotate the valve body 72 about the rotational axis, which is defined by the longitudinal axis 48 of the shaft 74. The drive unit 76 has a lever 78 coupled in a rotationally fixed manner with the shaft 74, as well as a pneumatic piston/cylinder arrangement 80. A piston rod 82 connected with the piston is coupled in an articulated manner with a lever 78 by means of a coupling element 84. The shaft 74, and therefore the valve body 72, is rotated and turned by moving the piston and the piston rod 82 back and forth within the cylinder of the piston/cylinder arrangement 80. In this way, the valve body 72 may selectively be moved between the closed position (FIG. 5) and the open position (FIG. 6) as well as into intermediate positions located between these two positions. The piston/cylinder arrangement 80 is coupled in a manner not shown in detail with a compressed air source and the controller. Alternative embodiments of the drive unit 76, for example electric, hydraulic or mechanical embodiments with different drives, such as drive motors, are possible.

A sensor unit 90 (FIGS. 4 through 6) serves to detect adhesive particles inside the filling passageway 46. With the sensor unit 90, it can be sensed and determined whether adhesive particles are present inside the filling passageway 46, especially while they move from an-upper-inlet side to a lower outlet side, and therefore to the inlet opening 22 of the tank 2, especially during their movement from above to below from a device (not shown) due to gravity.

Figure 5:
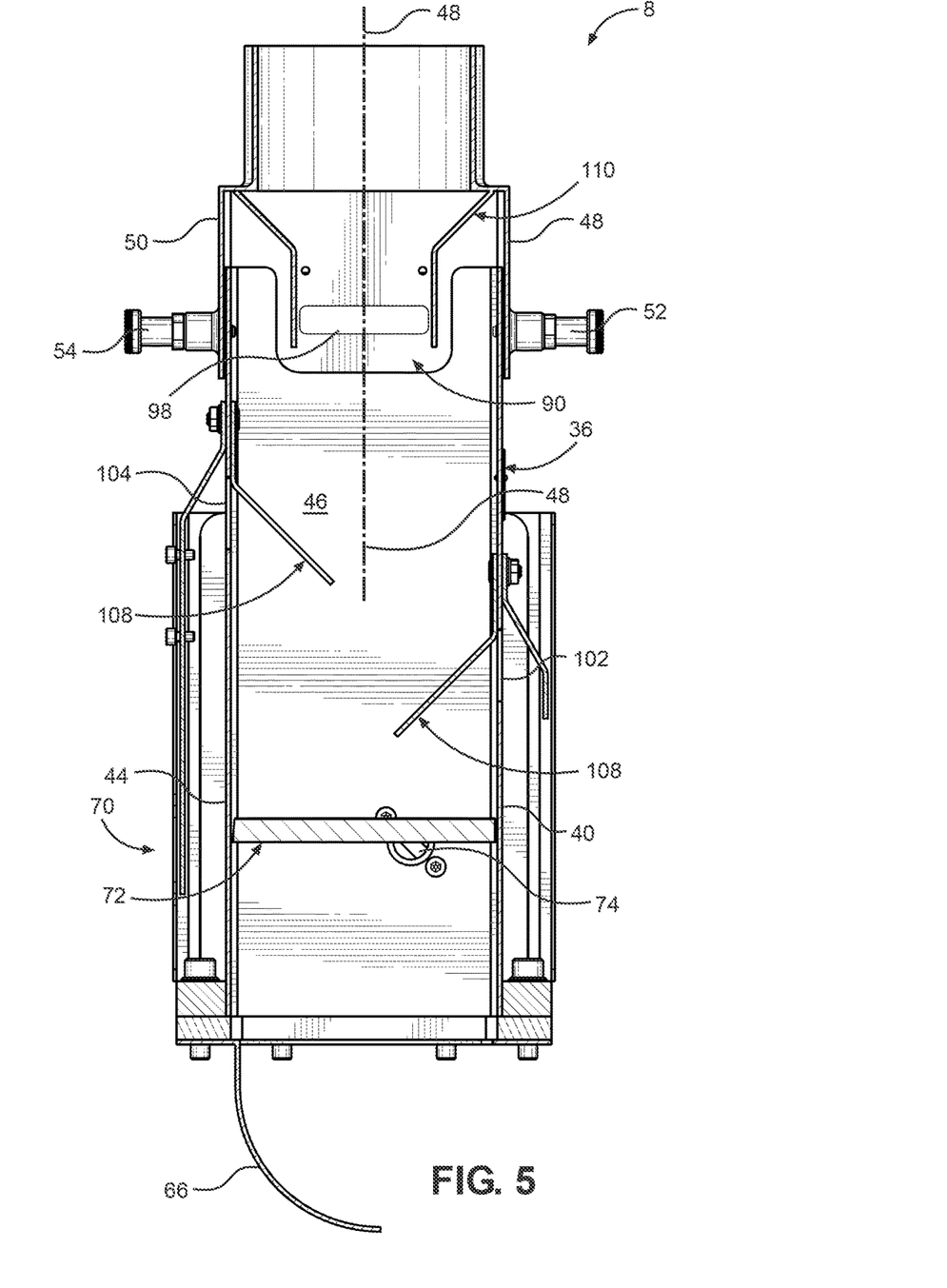
FIG. 5 the filling device according to FIG. 4a in a partial sectional presentation from one side with closed filling valve.
Figure 6:
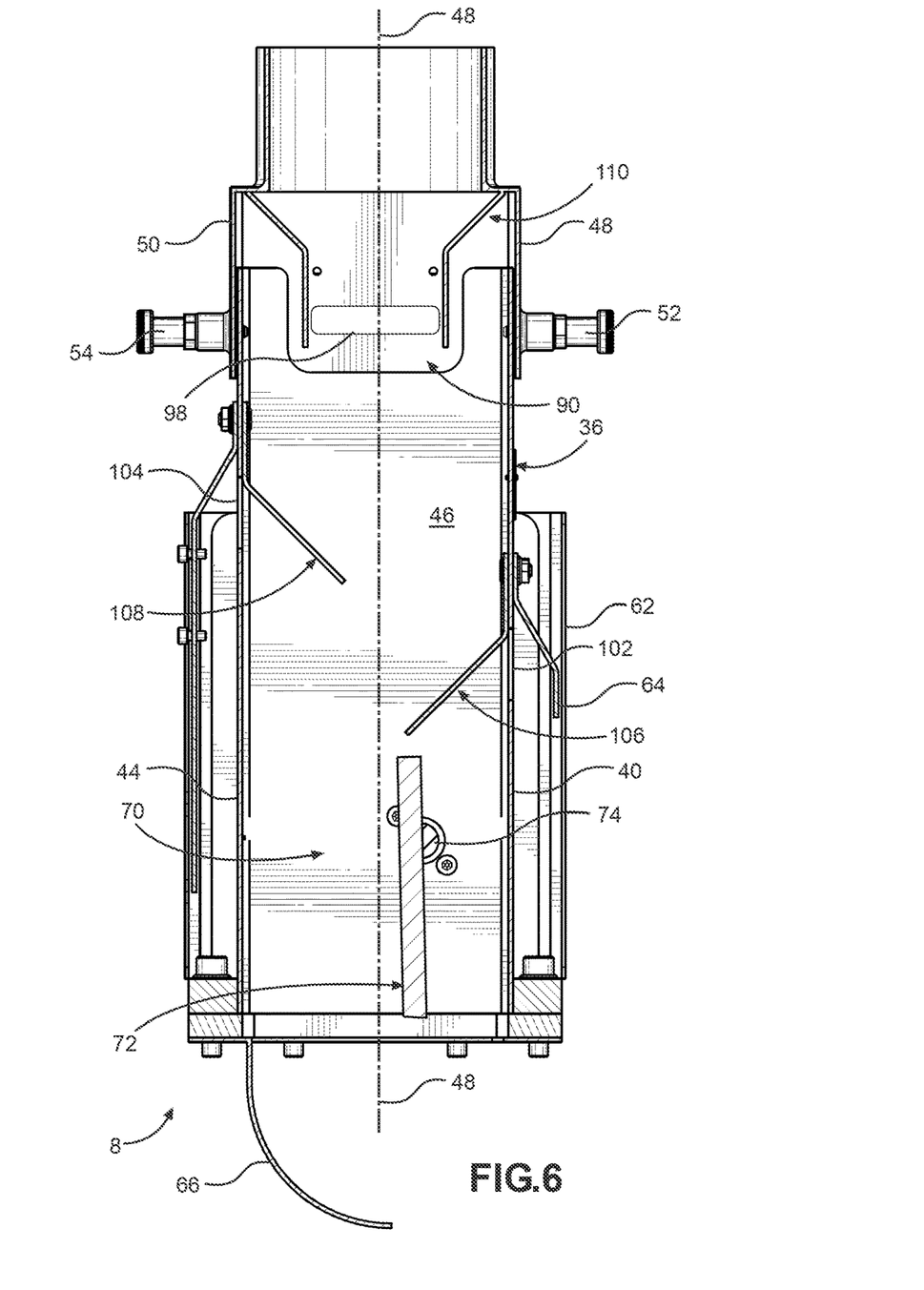
FIG. 6 the filling device according to FIG. 4a in a partial sectional presentation from one side with opened filling valve.

In the exemplary embodiment, the sensor unit 90 is designed as an optical sensor, but other sensor technologies may also be used. Two light barriers are part of the sensor unit 90. Two optical transceivers 92 are positioned adjacent to one another and adjacent to the filling passageway 46 on the wall 38 of the housing 36 (see FIG. 4a). A reflector 94 (FIG. 4a) is positioned on the opposite wall 42 of the housing 36. Each of the transceivers 92 is electrically connected with the controller and installed adjacent to the filling passageway 46 by means of an angle plate 96. As FIGS. 5 and 6 show, a viewing window 98, which is designed in the form of a simple cutout in the wall 38 or as a cutout with a transparent pane, is provided. Each transceiver 92 intermittently or continuously sends light signals through the flow cross-section of the filling passageway 46 in the direction of the reflector 94. The light signals are reflected by the reflector 94 and detected by the receiver part of the transceiver 92 when the light signal has free passage through the filling passageway 46. If an adhesive particle or multiple adhesive particles in the filling passageway 46 prevents the light signal from passing, no reflected light signal is captured by the transceiver 92. The sensor unit 90 generates corresponding signals that are an indicator of whether adhesive particles are present or not in the filling passageway 46. These signals are transmitted to the controller and from there to the drive unit 76 or are transmitted there directly.

During operation, the following operating method can thus be realized by means of the sensor unit 90, the filling valve 70 with the drive unit 76, and the controller:

Method for controlling the supply of adhesive particles to the tank 2 of a melter 1 by means of a filling device 8, in which adhesive particles in a solid state are detected by means of a sensor unit 90 for detecting adhesive particles within a filling passageway 46, in which, when the sensor unit 90 has detected adhesive particles within the filling passageway 46, the filling valve 70 of the filling device 8 is moved into an open position by means of a signal provided by the sensor unit 90, and in which, when no adhesive particles are detected in the filling passageway 46 by the sensor unit 90, the filling valve 70 is brought into the closed position.

Since the filling valve which has the movable valve body 72 closes or opens the free flow cross-section of the filling passageway 46, a heat introduction from the area of the tank 2 of the melter 1 through the filling device 8 may be suppressed or reduced in the closed position.

The valve body 72 has heat-insulating material. For this purpose, it is either completely made of the heat-insulating material, for example a foam material, another plastic with a relatively low thermal conductivity or a compound material, or is formed as a multi-layer body with interstices in which the thermal conductivity is low due to gas located there. The valve body 72 may also have a heat-insulating layer made of a heat-insulating material, for example temperature-resistant plastic.

For example, as FIGS. 5 and 6 illustrate, at least one gas discharge opening 102, 104 is provided at the filling passageway 46, or preferably multiple gas discharge openings 102, 104 are provided at the filling passageway 46, which gas discharge openings 102, 104 serve to discharge gases, especially air, from the filling passageway 46. Such gases may especially have been heated in the tank 2 via the heat emission of the heating device 4. Due to free convection, they rise and may penetrate further upward into the filling passageway 46 if the filling valve 70 is open. Via the openings 102, 104, they may be output to the environment of the filling device 8 of the melter 1.

In the walls 38, 40, 42, 44 of the housing 36, openings for discharging gases may also be formed between the valve body 72 of the filling valve 70 and the tank 2. The gas discharge openings may in this case have various shapes, for example breakthroughs with circular, oblong, slit-shaped, oval or other cross-sections.

Multiple guide means to guide adhesive particles and/or to guide gases present within the filling passageway 46 may be arranged within or on the filling passageway 46 and be formed there. They are preferably designed in the form of guide bodies or baffle plates. It is likewise preferred that the filling passageway is arranged substantially above the inlet opening of the tank or with at least one section above the filling valve and laterally offset in relation to the inlet opening of the tank. A first lower guide means 106 is arranged approximately above the valve 70 and is installed on the wall 44 of the housing 36 and is designed in the form of an angle plate. One part of the angle plate is bolted to the wall 44. The part of the baffle plate that sticks out at an angle of approximately between 20 and 90° is arranged adjacent to the opening 102. The baffle plate has a double function: On the one hand, it deflects adhesive particles moving downward in the filling passageway 46. On the other hand, it deflects gases flowing in the filling passageway 46 in the direction toward the gas discharge opening 102.

An additional guide means 108 in the form of an angled baffle plate is arranged further up within the filling passageway 46. The principle design corresponds to that of the guide means 106; in this respect, reference is made to the previous descriptions. The guide means 108 is arranged adjacent to the gas discharge opening 104. Gases may thus be discharged through the opening 102 into the environment.

An additional guide means 110 within the filling passageway 46 is arranged in an upper section. This guide means 110 likewise has multiple first sections externally attached to the housing 36 and dropping downward at an angle, and sections arranged parallel to the longitudinal axis 48 and extending substantially vertically downward. Adhesive particles that drop from above into the filling passageway 46 are thus directed into the inside of the filling passageway 46. Other shapes of the guide means 110 to guide the adhesive particles are possible. A guide means 106, 108, 110 is preferably formed by flat or plate-shaped bodies.

Figure 2:
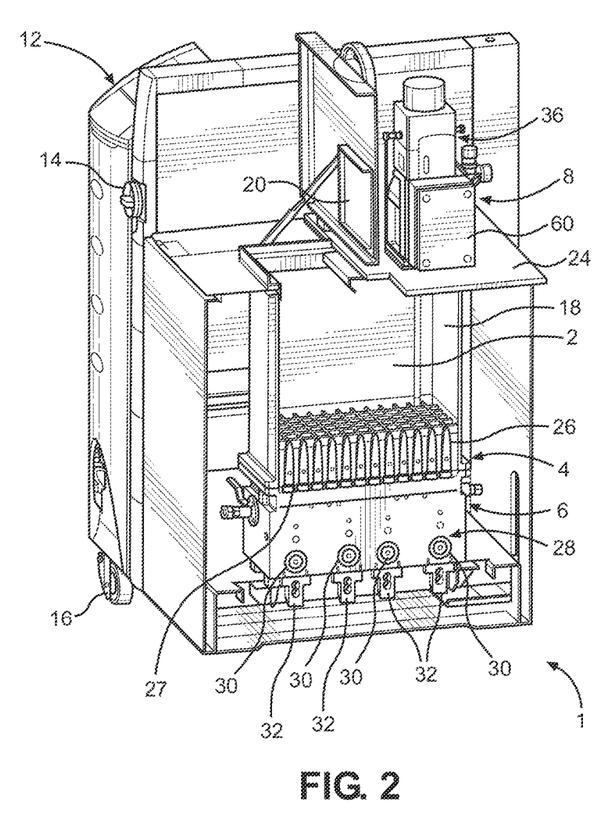
FIG. 2 the melter in perspective view at an angle from above.
Figure 3:
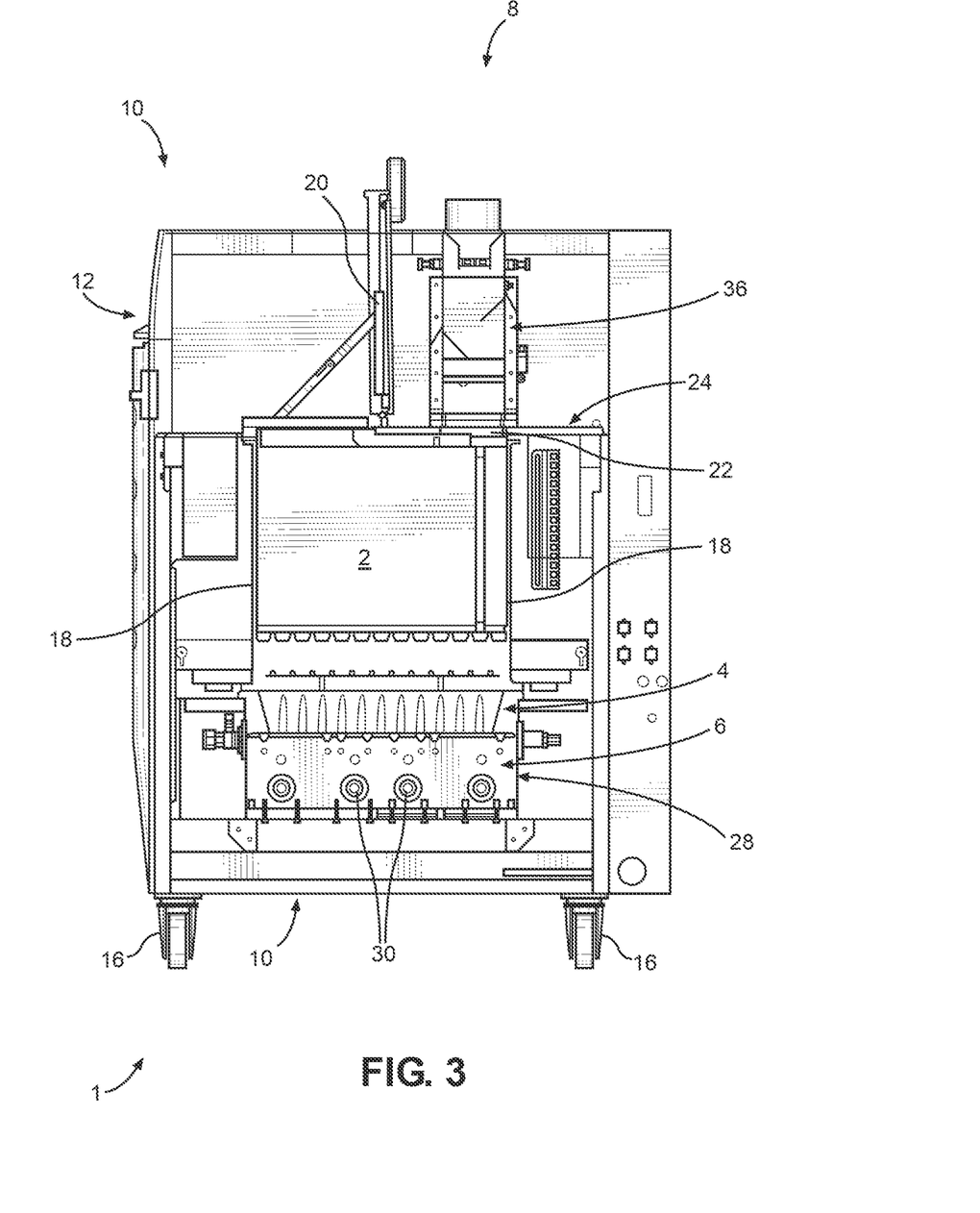
FIG. 3 the melter in a view from the side.
Figure 4A:
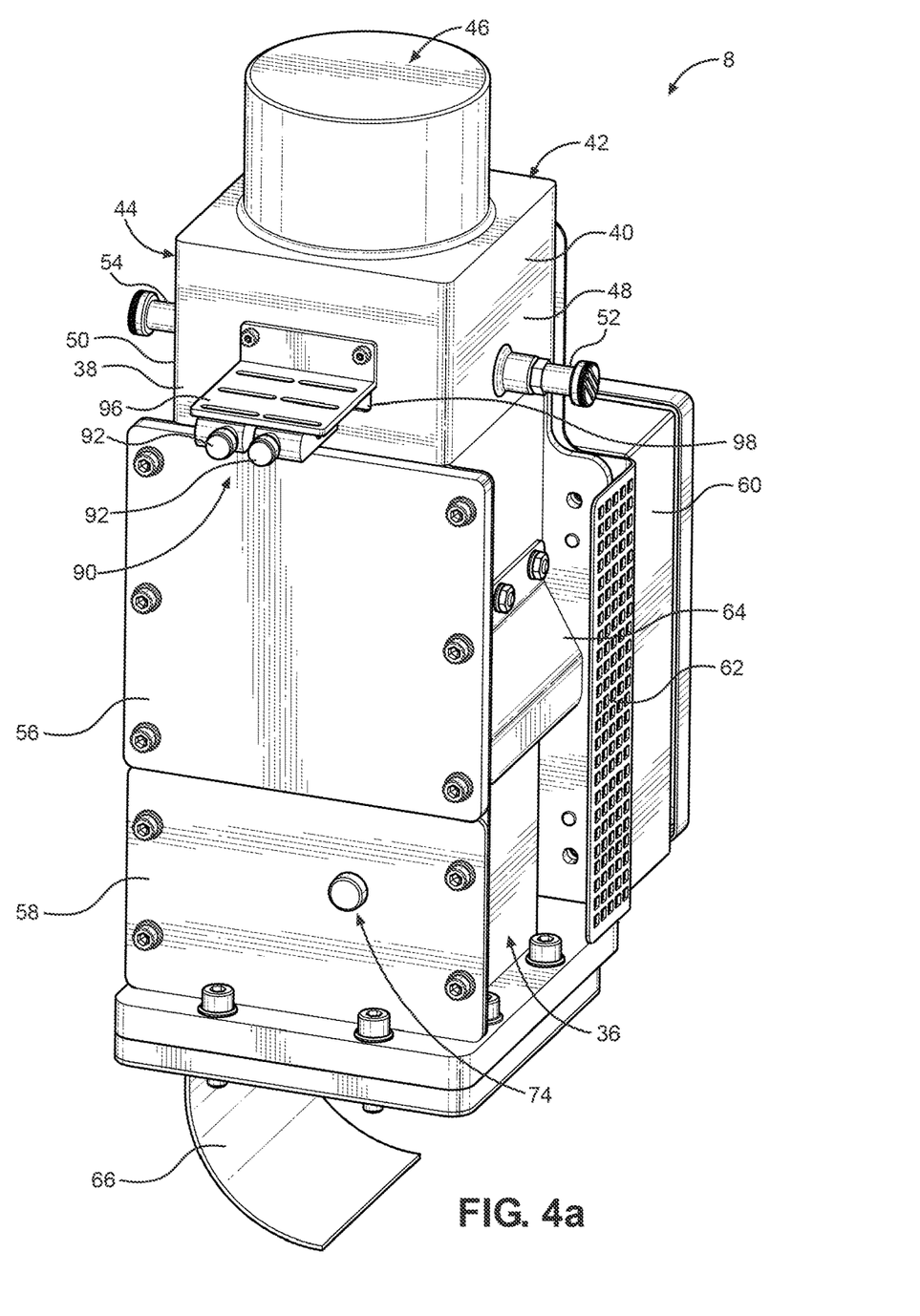
FIG. 4a a filling device according to the invention as part of the melter according to FIG. 1 in a perspective view at an angle from above.
Figure 4B:
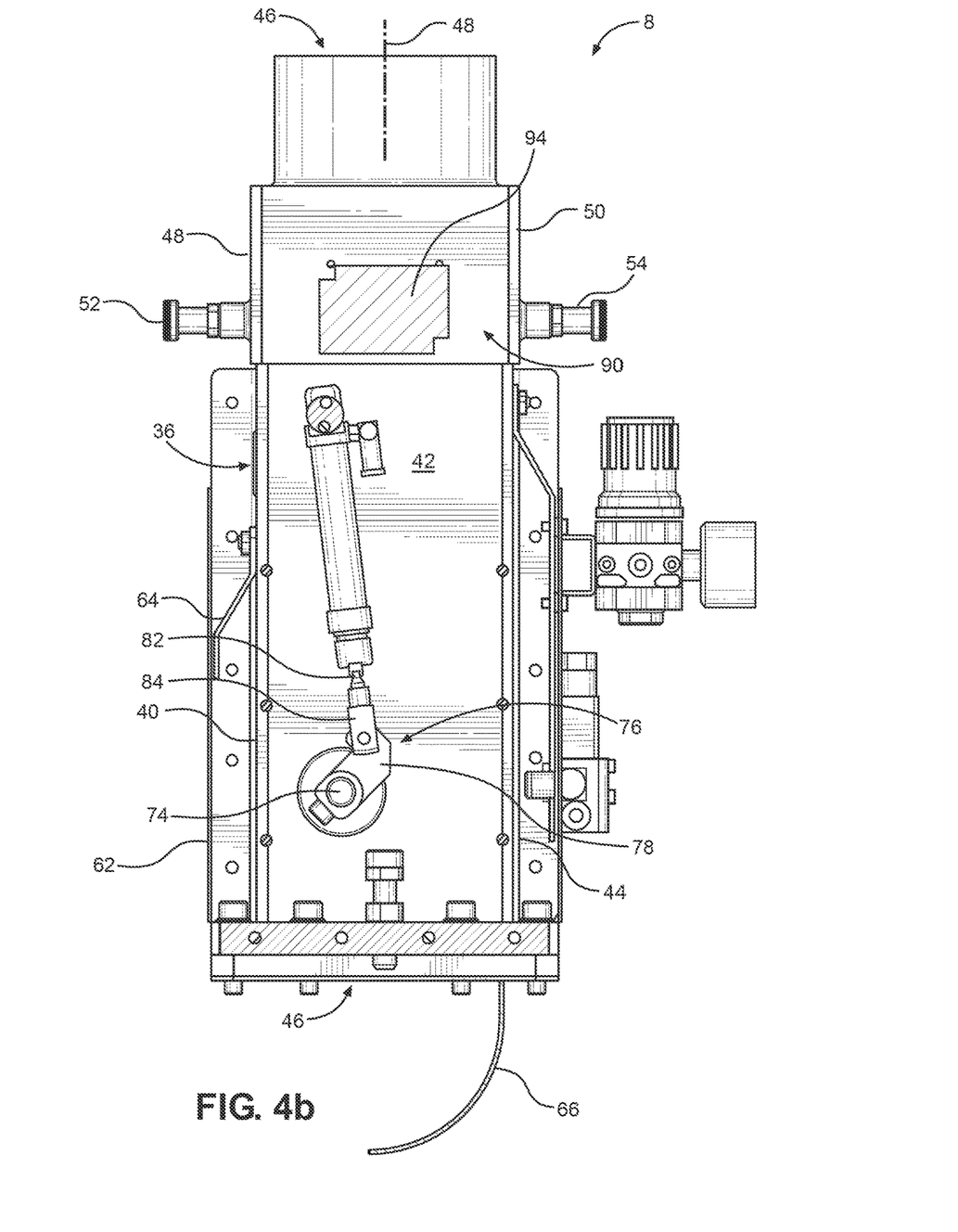
FIG. 4b the filling device according to FIG. 4a in a side view.
Figure 7:
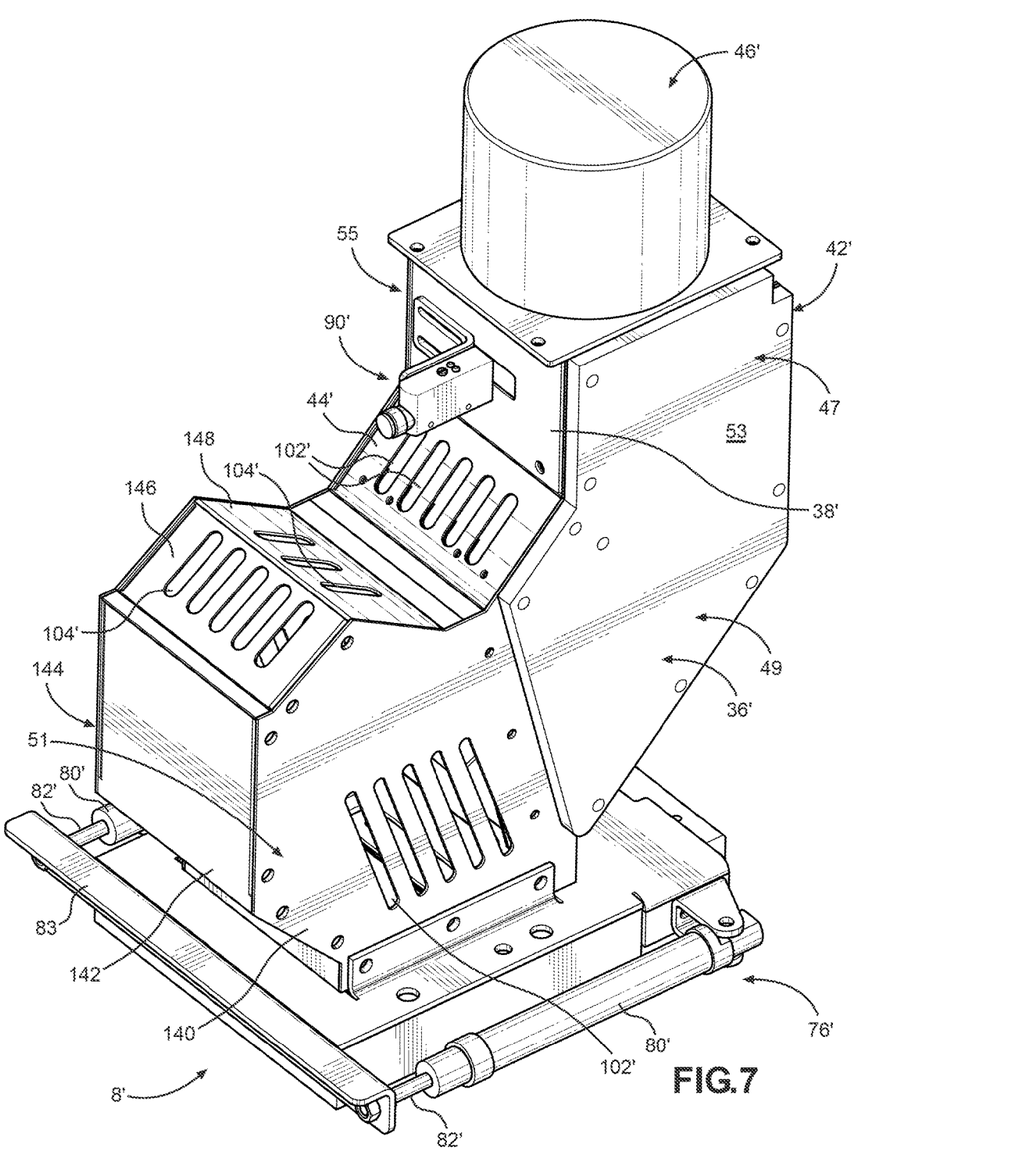
FIG. 7 a filling device according to the invention according to an alternative exemplary embodiment as part of a melter according to the invention according to FIG. 1 in a perspective view at an angle from above.
Figure 8:
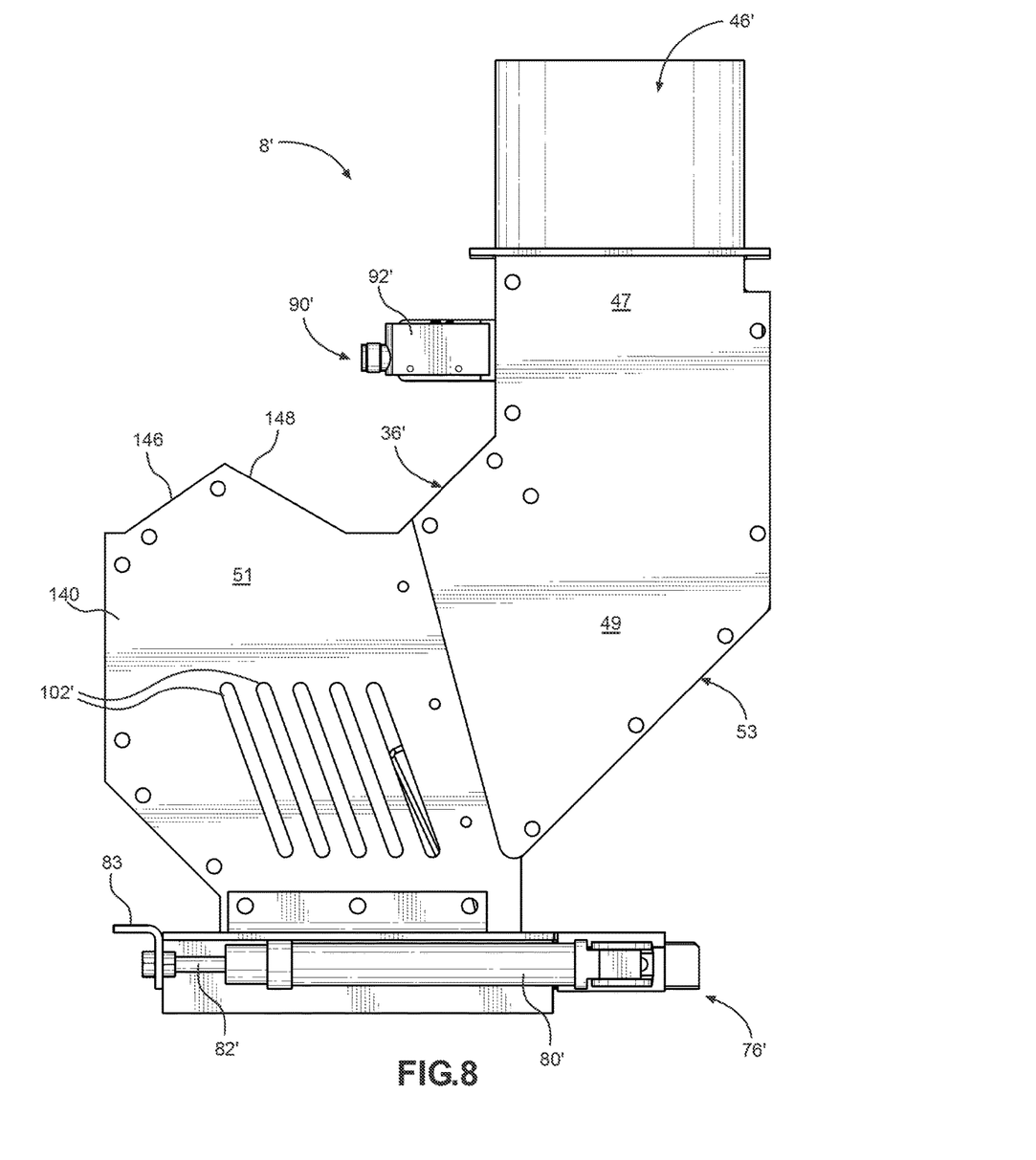
FIG. 8 the filling device according to FIG. 7 in a side view.

Like the previously described exemplary embodiment, the alternative exemplary embodiment of a filling device 8, shown in FIGS. 7 through 10, can be connected with a melter 1 and thus forms a part of the melter 1 (see FIGS. 1 through 3). The exemplary embodiment shown starting with FIG. 7 is, in principle, designed similar in terms of its functionality and many structural features to the exemplary embodiment of the filling device 8 shown before with reference to FIGS. 1 through 6; in this respect, reference is made to the preceding descriptions, and identical or similar modules are associated with the same reference characters with an apostrophe.

Figure 9:
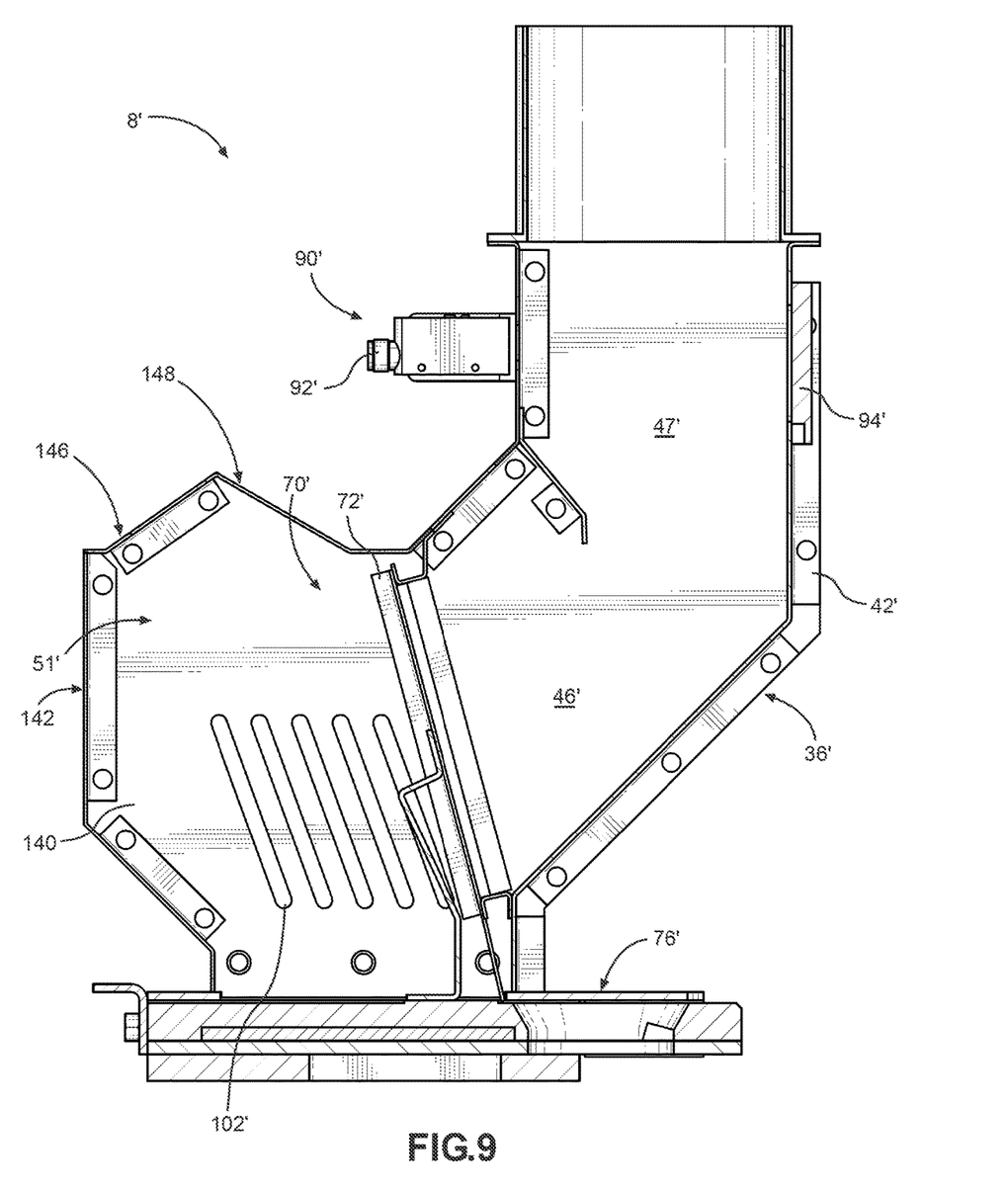
FIG. 9 the filling device according to the invention in a partial sectional presentation with closed filling valve.
Figure 10:
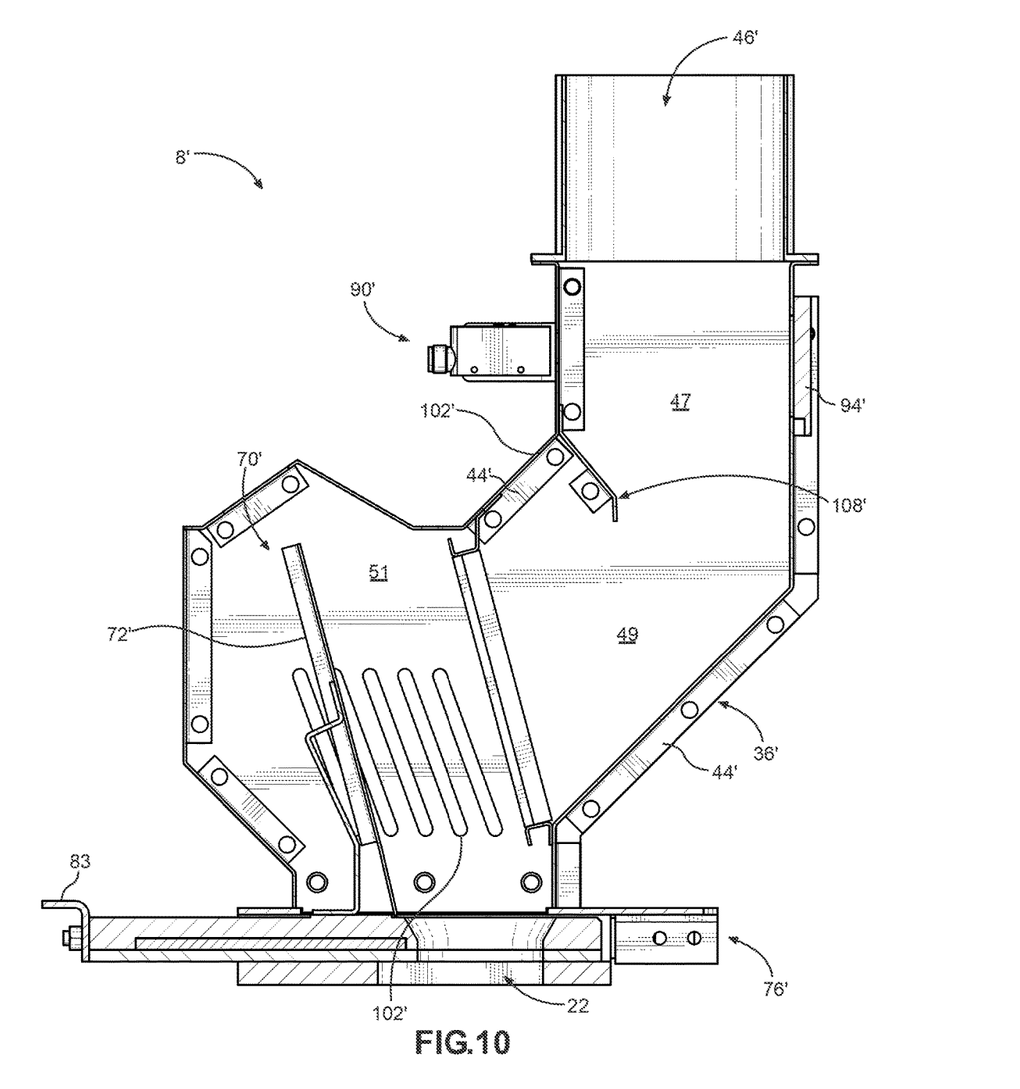
FIG. 10 the filling device according to the invention in a partial sectional presentation with opened filling valve.

The filling device 8' is attached to the melter 1 above a tank 2 (FIG. 1). Within a housing 36', a filling passageway 46' is formed into which adhesive particles can be filled at the top and that is arranged at its lower section adjacent to the inlet opening 22 of the tank 2 such that adhesive particles arrive in the tank 2 after the transport through the filling passageway 46. The filling passageway 46' does not have a straight, continuous, linear course but rather multiple offset sections so that overall a straight-line course is not created. As FIGS. 9 and 10 illustrate, the filling passageway 46' has a first upper and substantially vertically extending section 47; a second section 49 connecting thereto at the bottom and extending substantially at an angle of approximately 45°; and a third, substantially horizontal section 51 adjoining section 49 and arranged laterally thereto. Section 51 communicates with the inlet opening 22 of the tank 2 arranged below it. Sections 47 and 49 are laterally offset relative to the inlet opening 22 and the tank 2. Rising heat thus initially arrives in section 51.

The upper section 47 and middle section 49 are laterally bounded by plates 53, 55. Furthermore, two opposite plates or walls 38' and 42' are present in the upper section 47. A sensor unit 90' having a transceiver 92 is attached to the wall 38. Provided opposite on the wall 42 is a reflector 94', and reference is made to the above functional principles. Adhesive particles in the filling passageway 46' may be detected by means of the sensor unit 90'. The housing 36' in the section 49 has opposite walls 40', 44' extending at an angle. Provided in the wall 44' are multiple gas discharge openings 102' in the form of elongated slots in order to be able to discharge heated gas from the environment.

The section of the housing 36' that bounds the lower section 51 of the filling passageway 46' likewise has multiple plates or walls 140, 142, 144, 146, 148 that overall form a section of the housing 36' in the area of the section 51 of the filling passageway 46'. Multiple gas discharge openings 102', 104' for discharging gas are formed in the lateral wall 140 and the opposite wall 144. Here they are formed as elongated slots, five slots overall, extending somewhat inclined at an angle compared to vertical slots. Other shapes and arrangements are possible. Multiple gas discharge openings 104' are likewise formed in the wall 146, 148. Walls 146 and 148 are arranged in the manner of a gabled roof. Gas may be discharged from the housing 36' via the openings 102', 104'.

As FIGS. 9 and 10 show, an alternatively designed filling valve 70' with an alternatively designed plate-shaped valve body 72' provided that can be moved out of its closed position (FIG. 9), in which the filling passageway 46' is closed, into its open position (FIG. 10), in which the filling passageway 46' is open, so that adhesive particles may arrive in the tank 2. Valve body 72' is likewise preferably made of a heat-insulating material, or has heat-insulating material, in order to suppress or reduce a heat flow from the tank 2 through the filling passageway 46. Valve body 72' is not rotatable as in the exemplary embodiment but rather can be adjusted or moved translationally between its closed position (FIG. 9) and its open position (FIG. 10).

An alternatively designed drive unit 76' serves to move the valve body 72'. Two piston/cylinder arrangements 80' are coupled with the housing 36' of the filling device 8. The piston rod 82' is coupled on both sides with a profile, preferably an L-shaped profile 83, because two piston/cylinder arrangements 80' are present on opposite sides. The L-profile 83 is in turn coupled with the valve body 72' by means of actuators. Via actuation of the piston/cylinder arrangements 80, the valve body 72' can thus be moved translationally between the two shown positions.

As FIG. 10 in particular shows, in this exemplary embodiment may also be provided a guide means 108', preferably also adjacent to at least one gas discharge opening 102', in order to discharge rising gases from the filling passageway 46 outward into the environment.

The control of the melter 1, especially of the filling valve 70', depending on the presence or non-presence of adhesive particles in the area of the sensor unit 90' corresponds in principle to the functionality of the previously described exemplary embodiment, and reference is made to the above descriptions in this respect.

REFERENCE SYMBOL LIST

| | |
|---|---|
| 1 | Melter |
| 2 | Tank |
| 4 | Heating device |
| 6 | Pump(s) |
| 8 | Filling device |
| 10 | Housing |
| 12 | Control panels |
| 14 | Master switch |
| 16 | Rollers |
| 18 | Housing |
| 20 | Cover |
| 22 | Inlet opening |
| 24 | Installation plate |
| 26 | Heating elements |
| 28 | Manifold |
| 30 | Adhesive filters |
| 32 | Connections |
| 36, 36' | Housing |
| 38, 40, 42, 44 | Walls |
| 46 | Filling passageway |
| 47, 49, 51 | Section |
| 48 | Longitudinal axis |
| 48, 50 | Maintenance flaps |
| 52, 54 | Retention pins |
| 53, 55 | Plates |
| 56, 58 | Housing plates |
| 60 | Housing |
| 62 | Protective grating |
| 64 | Baffle |
| 66 | Manifold body |
| 70, 70' | Filling valve |
| 72, 72' | Valve body |
| 74 | Cylindrical shaft |
| 76 | Drive unit |
| 78 | Lever |
| 80, 80' | Piston/cylinder arrangement |
| 82 | Piston rod |
| 84 | Coupling element |
| 90, 90' | Sensor unit |
| 92 | Transceiver |
| 94 | Reflector |
| 96 | Angle plate |
| 98 | Viewing window |
| 102', 104' | Gas discharge openings |
| 106, 106', 108, 108', 110 | Guide means |
| 140, 142, 144, 146, 148 | Plates/walls |

What is claimed is:

1. A melter for melting substantially solid adhesive particulate and supplying liquid adhesive, the melter comprising:
    a tank having an inlet opening for receiving the substantially solid adhesive particulate;
    a heating device coupled to said tank, the heating device configured to heat the substantially solid adhesive particulate, said heating device having at least one passageway for the liquid adhesive;
    at least one pump for conveying the liquid adhesive; and
    a filling device for filling the tank with the substantially solid adhesive particulate, said filling device being arranged to feed the substantially solid adhesive particulate through the inlet opening of said tank,
    wherein the filling device has a filling passageway and a filling valve with a movable valve body which is arranged in the filling passageway and which is adjustable from a closed position in which a free cross-section of the filling passageway is substantially closed by the valve body and an open position in which the free cross-section of the filling passageway is substantially open.

2. The melter of claim 1, further comprising:
    a controller;
    a drive unit for adjusting the filling valve; and
    a sensor configured to detect adhesive particulate inside the filling passageway, said sensor supplying a signal to the drive unit for adjusting the filling valve.

3. The melter of claim 2, wherein the sensor is configured to detect adhesive particulate dropping inside the filling passageway in a direction of the filling valve.

4. The melter of claim 2, wherein the sensor comprises an optical transceiver.

5. The melter of claim 2, wherein the sensor is a capacitive sensor.

6. The melter of claim 2, wherein the valve body is connected to the drive unit, and the valve body is a flap which is rotatable or translationally movable.

7. The melter of claim 1, wherein the valve body of the filling valve comprises a heat-insulating material to reduce heat from the tank through the filling passageway when the valve body is in the closed position.

8. The melter of claim 1, wherein the filling passageway has at least one opening for discharging gases which have been heated in the tank.

9. The melter of claim 8, wherein the at least one gas discharge opening is arranged between the valve body and the inlet opening of the tank.

10. The melter of claim 8, wherein the at least one gas discharge opening is arranged above the valve body.

11. The melter of claim 8, wherein the at least one gas discharge opening is an elongated slot or a substantially cylindrical bore.

12. The melter of claim 1, further comprising at least one guide inside the filling passageway to guide the substantially solid adhesive particulate or gases flowing inside the filling passageway.

13. The melter of claim 12, wherein at least one guide is a baffle plate.

14. The melter of claim 12, further comprising at least one gas discharge opening arranged below the guide such that rising heated gases are guided towards the at least one gas discharge opening.

15. The melter of claim 12, wherein the at least one guide is a plate-shaped member and is arranged at an incline at an angle between 90° and 10° relative to the vertical.

16. The melter of claim 12, wherein the at least one guide is a plate-shaped member and is arranged at an incline at an angle 60° and 30° relative to the vertical.

17. The melter of claim 1, wherein the filling passageway is arranged above the inlet opening of the tank and laterally offset in relation to the inlet opening of the tank.

18. The melter of claim 1, wherein the filling passageway is arranged with at least one section above the filling valve.

19. The melter of claim 1, wherein the valve body is translationally arranged inside a first section of the filling passageway above the inlet opening of the tank and the first section is adjoined by a further upper section of the filling passageway, which is laterally offset from the inlet opening of the tank.

20. The melter of claim 1, wherein inner surfaces of the filling passageway or surfaces of the valve body of the filling valve are coated with a material for reducing friction or adhesion between the filling passageway or the surfaces of the valve body of the filling valve and the substantially solid adhesive particulate.

* * * * *